United States Patent
Härmä et al.

(10) Patent No.: US 12,236,200 B2
(45) Date of Patent: Feb. 25, 2025

(54) PRIVACY-PRESERVING TEXT INSIGHT MINING IN A CLOSED DOMAIN

(71) Applicant: KONINKLIJKE PHILIPS N.V., Eindhoven (NL)

(72) Inventors: Aki Sakari Härmä, Eindhoven (NL); Rim Helaoui, Eindhoven (NL); Abhinay Maheshbhai Pandya, Eindhoven (NL); Allmin Pradhap Singh Susaiyah, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 295 days.

(21) Appl. No.: 17/980,003

(22) Filed: Nov. 3, 2022

(65) Prior Publication Data
US 2023/0161972 A1 May 25, 2023

Related U.S. Application Data

(60) Provisional application No. 63/277,798, filed on Nov. 10, 2021.

(51) Int. Cl.
*G06F 40/40* (2020.01)
*G06F 40/289* (2020.01)
*G06N 20/00* (2019.01)
*G06F 40/30* (2020.01)

(52) U.S. Cl.
CPC ............ *G06F 40/40* (2020.01); *G06F 40/289* (2020.01); *G06N 20/00* (2019.01); *G06F 40/30* (2020.01)

(58) Field of Classification Search
CPC ......... G06F 40/40; G06F 40/30; G06F 40/289
See application file for complete search history.

(56) References Cited

U.S. PATENT DOCUMENTS

| 9,916,609 | B1 | 3/2018 | Patel | |
|---|---|---|---|---|
| 11,023,946 | B2 | 6/2021 | Nichols | |
| 2017/0004205 | A1 | 1/2017 | Jain | |
| 2017/0103402 | A1 | 4/2017 | El-Diraby | |
| 2018/0268019 | A1* | 9/2018 | Rostagni | ............ G06F 16/2365 |
| 2020/0012919 | A1* | 1/2020 | Bathaee | ................ G06N 20/10 |
| 2021/0158919 | A1 | 5/2021 | Meltabarger | |

FOREIGN PATENT DOCUMENTS

WO     WO2017222902 A1     12/2017

* cited by examiner

*Primary Examiner* — Ibrahim Siddo
(74) *Attorney, Agent, or Firm* — Michael W. Haas

(57) ABSTRACT

An embodiment provides a method including obtaining language input data and providing the language input data to a first generative language model and a second generative language model. A first response from the first generative language model and a second response from a second generative language model are obtained. An indication is provided of a difference between the first response from the first generative language model and the second response from the second generative language model.

15 Claims, 6 Drawing Sheets

PRIVACY-PRESERVING TEXT INSIGHT MINING IN A CLOSED DOMAIN

CROSS-REFERENCE TO RELATED APPLICATIONS

This patent application claims the priority benefit under 35 U.S.C. § 119(e) of U.S. Provisional Application No. 63/277,798, filed on Nov. 10, 2021, the contents of which are herein incorporated by reference.

BACKGROUND OF THE INVENTION

1. Field of the Invention

The present invention pertains to using generative language models in natural language processing (NLP) tasks, and, in particular, using generative language model bias to gain new insights, for example in preparing natural language generation (NLG) text for use in text mining or sentiment analysis applications.

2. Description of the Related Art

In Natural Language Generation (NLG) tasks, the goal is to create new text content based on other texts, or data, for example. NLG tasks include use of generative language models. A "generative language model" includes statistical or learning models that predict language (words or phrases) using linguistic knowledge automatically obtained from a corpus of text. Many state-of-the-art NLG systems are based on massive generative language models trained using deep learning techniques. For example large generative language models such as Turing Natural Language Generation (T-NLG), Generative Pre-trained Transformer 3 (GPT-3), Bidirectional Encoder Representations from Transformers (BERT), GPT-2, GPT, etc., have been used to generate text such as a sentence or paragraph in response to a prompt. NLG models may be formed as transformer-based deep learning neural networks trained on a large body or corpus of text, e.g., substantially all text published on the internet. Such models have been utilized to perform analysis tasks.

Sentiment analysis includes the use of natural language processing (NLP) and related text analysis methods to identify or quantify subjective information, such as positive or negative sentiment contained in language such as a written product review or voice input encountered during a customer service interaction. Many services exist to score language input as a service, where the service returns a sentiment analysis score or category based on input language. Aspect-Based Sentiment Analysis (ABSA) is collection of language processing techniques that aims at a specific analysis, for example analysis of user opinions, such as contained in product reviews, to discover topics users describe and their sentiment towards the topics, etc.

It is also known that models, such as the NLG models trained on a large body of text as described above, may contain various kinds of biases. For example, GPT-3 is known to generate different text when it is used to generate text about different genders or cultural backgrounds.

Given the potential privacy implications of using text to train the models, preserving user privacy in forming and using language models generally has been addressed, e.g., via use of some obfuscation mechanism such as described in WO2017222902A1, entitled Privacy-preserving machine learning, published on Dec. 28, 2017.

SUMMARY OF THE INVENTION

Conventionally for a generalized generative language model such as GPT-3, T-NLG or the like, which is trained on a large body of text and contains biases, these biases have been viewed as a problem to be minimized. Various efforts have been made to improve the models to address the biases and reduce their impact.

Accordingly, it is an advantage of the claimed embodiments to provide a technical approach that overcomes the shortcomings of conventional bias minimization techniques and related approaches that consider the model biases as flaws to be managed. This advantage is achieved according to one embodiment by providing a system that includes the use of generative language model biases to highlight differences between models, where these differences are in turn used to some practical effect, such as in text mining or sentiment analysis applications, etc.

In summary, one embodiment provides a method including obtaining, from an input device, language input data and providing the language input data to a first generative language model and a second generative language model. A first response from the first generative language model and a second response from a second generative language model are obtained. An indication is provided of a difference between the first response from the first generative language model and the second response from the second generative language model.

Another embodiment provides a system that includes a set of one or more processors; and a set of one or more memory devices storing code executable by the set of one or more processors to perform a set of functions. In an embodiment, the system obtains language input data and provides the language input data to a first generative language model and a second generative language model. The system obtains a first response from the first generative language model and a second response from a second generative language model and provides an indication of a difference between the first response from the first generative language model and the second response from the second generative language model.

A further embodiment provides a computer program product including a non-transitory storage medium having computer executable code. The computer executable code includes code that obtains, from an input device, language input data and provides the language input data to a first generative language model and a second generative language model. The computer executable code also includes code that obtains a first response from the first generative language model and a second response from a second generative language model and provides an indication of a difference between the first response from the first generative language model and the second response from the second generative language model.

The foregoing is a summary and thus may contain simplifications, generalizations, and omissions of detail; consequently, those skilled in the art will appreciate that the summary is illustrative only and is not intended to be in any way limiting.

These and other objects, features, and characteristics of the present invention, as well as the methods of operation and functions of the related elements of structure and the combination thereof, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

DETAILED DESCRIPTION OF EXEMPLARY EMBODIMENTS

As used herein, the singular form of "a", "an", and "the" include plural references unless the context clearly dictates otherwise. As used herein, the statement that two or more parts or components are "coupled" shall mean that the parts are joined or operate together either directly or indirectly, i.e., through one or more intermediate parts or components, so long as a link occurs. As used herein, "operatively coupled" means that two or more elements are coupled so as to operate together or are in communication, unidirectional or bidirectional, with one another.

As used herein, the term "number" shall mean one or an integer greater than one (i.e., a plurality). As used herein a "set" shall mean one or more.

As used herein "generative language model" or "natural language generation (NLG) model" includes statistical or learning models that predict language (one or more words or phrases) using linguistic knowledge automatically obtained from a corpus of text (also referred to herein as "documents").

Figure 1:
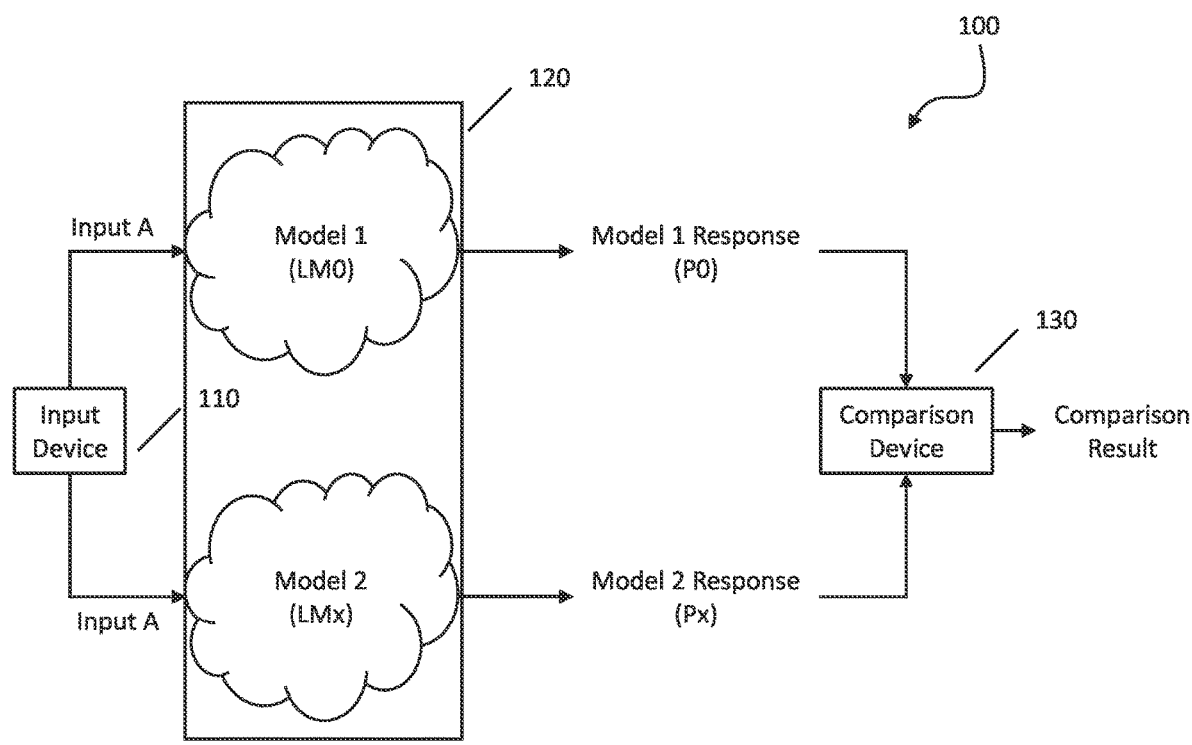
FIG. 1 is an example system for using a combination of language models to produce comparison data.

FIG. 1 schematically illustrates an example of a system 100 according to the principles of the present invention. As with the other figures, FIG. 1 illustrates an example in which, in some embodiments, one or more of the elements, features or components are utilized, whereas in other embodiments, some of the example elements, features or components may not be utilized, may be utilized differently, or may be utilized in combination with other components, other elements or other features, as the context dictates. Non-limiting examples are provided herein to illustrate various different implementations. The scope of the invention will be pointed out in the appended claims.

In the example of FIG. 1, system 100 includes an input device 110, a modeling device 120, and a comparison device 130. As may be appreciated, the example input device 110, modeling device 120, and comparison device 130 may be single, discrete devices, may be consolidated, e.g., into a single device, or may be distributed, e.g., more than one device acts to perform the described functionality of input device 110, modeling device 120, or comparing device 130. Likewise, while a single instance of each device is illustrated for each of input device 110, modeling device 120, and comparison device 130, more than one of each device, acting independently or in concert with others of the same or different type, may be utilized, e.g., multiple modeling devices providing different models, multiple input devices providing different inputs such as training data and prompt data, etc. Further, as explained in connection with FIG. 5, various ones of input device 110, comparison device 120, and modeling device 130 may include a set of components comprising a processor and memory storing code executable by the processor to perform function(s) described in connection with the device.

Input device 110 provides a mechanism for supplying modeling device 120 with data such as training data, input prompts, queries, etc. In one example, input device 110 is a computer that provides a web application (web app) for a user to interact with a graphical user interface (GUI) for inputting prompts. Other examples are possible, for example input device 110 may be a mobile device that provides a mobile application, input device 110 may be a subcomponent of another device, e.g., a touch screen, keyboard, etc. Further, input device 110 may be hardware providing an input/output interface facilitating an application programming interface (API) for interacting with the modeling device 120.

Modeling device 120 receives data from input device 110. In one example, modeling device 120 includes a plurality of cloud devices collectively provided as a logical service available to input device 110. By way of specific example, modeling device 120 may provide one or more application programming interfaces (APIs) for supplying data via input device 110, such as for example supplying training data from a closed domain, supplying input indicating prompts or prompt templates, the data forming prompts or queries themselves, etc. In another example, e.g., where input device 110 and modeling device 120 are integrated into one device or service offered by an entity, modeling device 120 may use input device 110 as a mechanism for receiving input data.

Modeling device 120 supplies one or more models. In the example illustrated in FIG. 1, two models, Model 1 (LM0) and Model 2 (LMx) are provided. In another example, only one model is supplied, whereas a separate device or service provides the other model or data related thereto, as will become apparent throughout. The models LM0 and LMx may take the form of natural language generation (NLG) models, which function as a baseline or generalized model (LM0) and a biased model (LMx) trained on a population of interest. In other examples, the models are both biased, e.g., two target populations are used to train the models for differential output. The models may be formed or provided as described in the example of FIG. 3.

Irrespective of how the models are formed or provided, each of Model 1 and Model 2 are trained to provide different outputs when receiving the same input (which may also be referred to as "common input"). For example, Model 1 may be a generalized NLG model trained on a large, open domain, such as GPT-2 or GPT-3. In one example, Model 1 may be used via standard API to query or prompt the model, as in sending data to an API of publicly available GPT-2. In one example, Model 2 is likewise a generalized NLG model trained on a large, open domain, e.g., GPT-2 or GPT-3. However, in an embodiment Model 2 is purposefully trained on a closed or specialized domain, for example a clinical text gathered for example from a healthcare worker social media page or conversation forum, a product feedback page, a subset of social media data (such as product referencing tweets and hashtags), etc. This differentiates Model 2 from Model 1 at least in terms of training data. Other differences may be introduced so long as the desired differential outputs are produced in sufficient quantities or of sufficient quality for the use case. For example, a difference in the same model over time may be used, e.g., a version of Model 1 may be used as a baseline model, whereas Model 1 at a later time, after subsequent rounds of training, may be utilized as Model 2. In some embodiments, three or more models may be utilized, e.g., with comparisons made pairwise as in the examples provided herein related to using two models. For example, text generated by different models could be compared using data clustering methods, or could be sorted based on some common variable.

Given that Model 1 and Model 2 have differences therebetween, e.g., in terms of biases generated through training on different training texts, Model 1 and Model 1 should handle the same or common input, e.g., "Input A" of FIG. 1 differently, as further described in connection with FIG. 2. In the example of FIG. 1, Model 1 receives Input A, which may be a prompt in the case where Model 1 is an NLG model such as GPT-2, and provides an output or Model 1 Response (P0), which may correspond to a generated text such as a sentence, an answer, a paragraph, etc., generated by Model 1 in response to Input A. Likewise, Model 2 may receive the same Input A and generate a different output or Model 2 Response (Px), which likewise may take the form of a generated text in response to a prompt of Input A.

Comparison device 130, which as noted may be co-located or integrated with input device 110, modeling device 120, or provided independently as indicated at 130, compares the outputs produced by Model 1 and Model 2 given Input A to generate comparison data, such as a comparison result as indicated in FIG. 1. The functions performed by comparison device 130 may take a variety of forms. For example, if Model 1 and Model 2 are NLG models trained on different texts, e.g., one generalized and one biased via use of a closed domain as additional or different training input, the comparison result may take the form of listing the differential responses, highlighting keywords differentiating the responses, providing further processing such as a difference score, etc. This permits an end user or application program, or combinations thereof, to utilize the difference in output to make decisions, take actions, or formulate downstream actions and automated workflows, such as providing difference or comparison data to a marketing user via comparative display, detecting a keyword generated by the model(s) and initiating a record update in a customer relationship management (CRM) or marketing system, or triggering a workflow in a CRM or marketing system to notify a user of an insight, etc.

Figure 2:
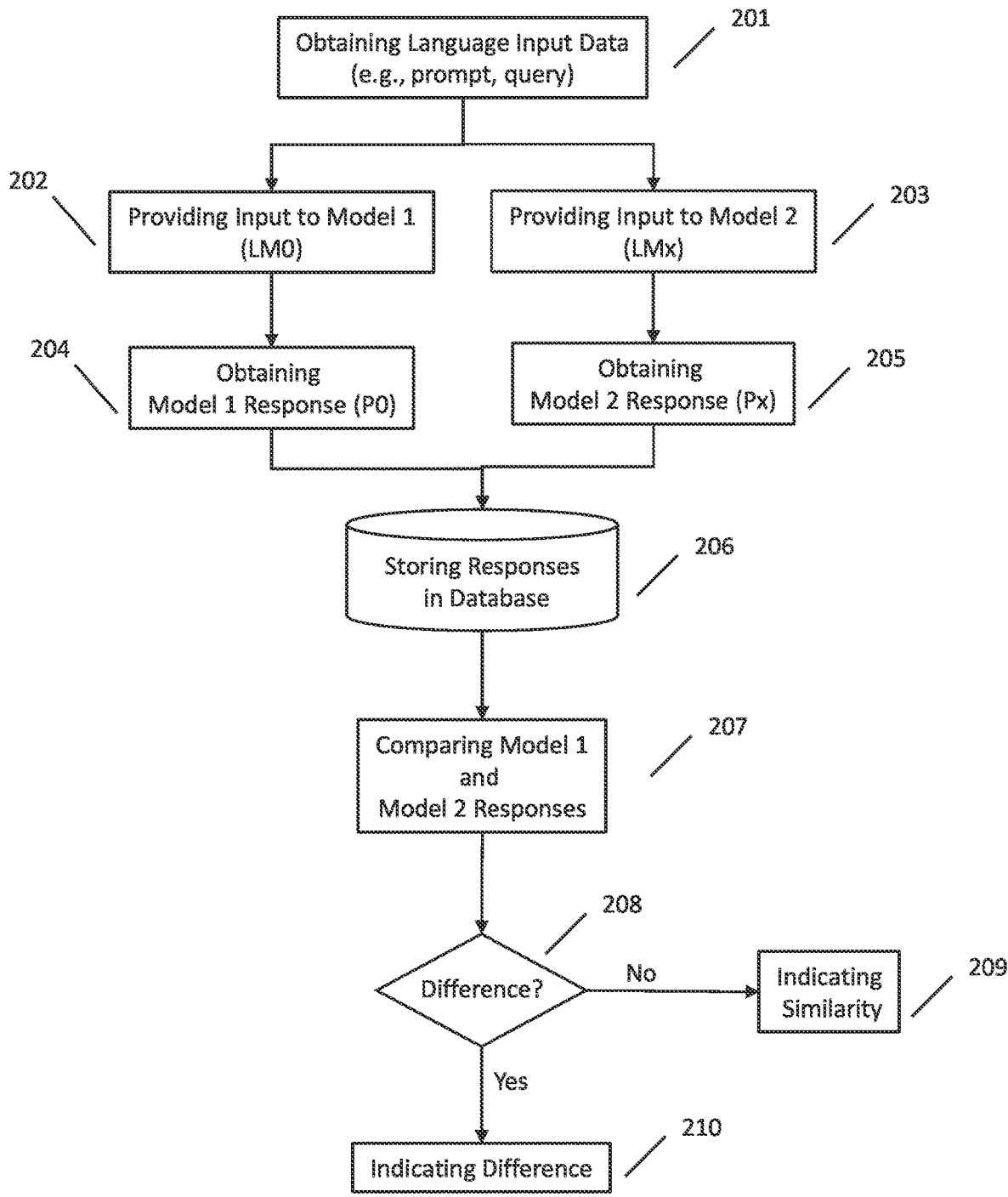
FIG. 2 is an example method of using a combination of language models to produce comparison data.

In an embodiment, a method such as outlined in FIG. 2 is provided to produce comparison data. As illustrated, the method may include obtaining language input data at 201, such as obtaining a prompt or a query for operation of an NLG model. The act of obtaining the language input data at 201 may include receiving a prompt via a web or mobile application, as input by a user and communicated over a network to a cloud service provider offering the model(s) as a service. Other examples are possible, e.g., obtaining the language input data at 201 by receiving it from an application over a local bus or network connection, e.g., in the case that one or both of Model 1 and Model 2 are operated locally on the same device or on-premises in a local network.

In some embodiments, the acts of obtaining and providing are different. For example, where a remote service is used as a model provider, the obtaining at 201 may be omitted or consolidated with the providing at 202 and 203, as all the method requires is receiving the input data, e.g., as an API request, and providing it to the models. In contrast, the method may also include act(s) related to obtaining the language input data at 201, e.g., operating a local or client application to present a GUI for input of a prompt, indication of a prompt template, etc.

As illustrated in FIG. 2, an embodiment utilizes two or more models, e.g., Model 1 and Model 2, in combination. Therefore, the method may include providing the input data to the models Model 1 (LM0) and Model 2 (LMx) as indicated at 202 and 203, respectively. Model 1 and Model 2 operate on the input data and provide associated model responses, i.e., Model 1 Response (P0) and Model 2 Response (Px), as indicated at 204 and 205, respectively. In an embodiment (not illustrated in FIG. 2), the method may include operating one or more of the models, e.g., modeling device 120 of FIG. 1 may perform the step(s) of running Model 1 or Model 2, or both, to produce the outputs P0 and Px. In an embodiment, the method does not require operating Model 1 or Model 2, and rather includes calling Model 1 and Model 2 via API as a service, e.g., provided by an external provider such as a cloud service provider offering models in a software as a service (SaaS) offering. In an embodiment, a combination of operating or running a model, e.g., Model 2, and calling a model service, e.g., for Model 1, may be combined.

At 206 the method includes storing the model responses in a database (noting that the database may be distributed). This provides comparison device 130 of FIG. 1 with access to the model outputs for use in comparisons and related functions, as described herein.

The method may include operating comparison device 130 to provide for comparing of the Model 1 and Model 2 Responses, as indicated at 207. As described herein, depending on the entities involved and their respective functions, operation of comparison device 130 or related program or service may not be included in a method of an embodiment. For example, a cloud service provider may not offer comparison services or may only offer a limited set of comparison services for consumption by an interested entity such as an entity operating a data input or comparison application or service; in such a context, the method may conclude with providing model output(s) or offering storage of them for subsequent processing, e.g., text mining applications, which may be considered as providing an indication of differences between the models, as further described herein.

In the example of FIG. 2, the comparing at 207 may include determining if there is a difference between the model outputs, as indicated at 208. By way of example, text matching or similarity analysis may be performed to identify textual differences at 208. Similarly, sentiment analysis may be conducted at 208 to determine if there is a different sentiment attached to the output of the models. In the case of similarity, an indication thereof can be provided, as indicated at 209. Otherwise, a difference may be indicated as illustrated at 210. Further non-limiting examples of comparison data and its potential uses, such as illustrated at 209 and 210, are provided in connection with FIG. 4 and FIG. 4A.

Figure 3:
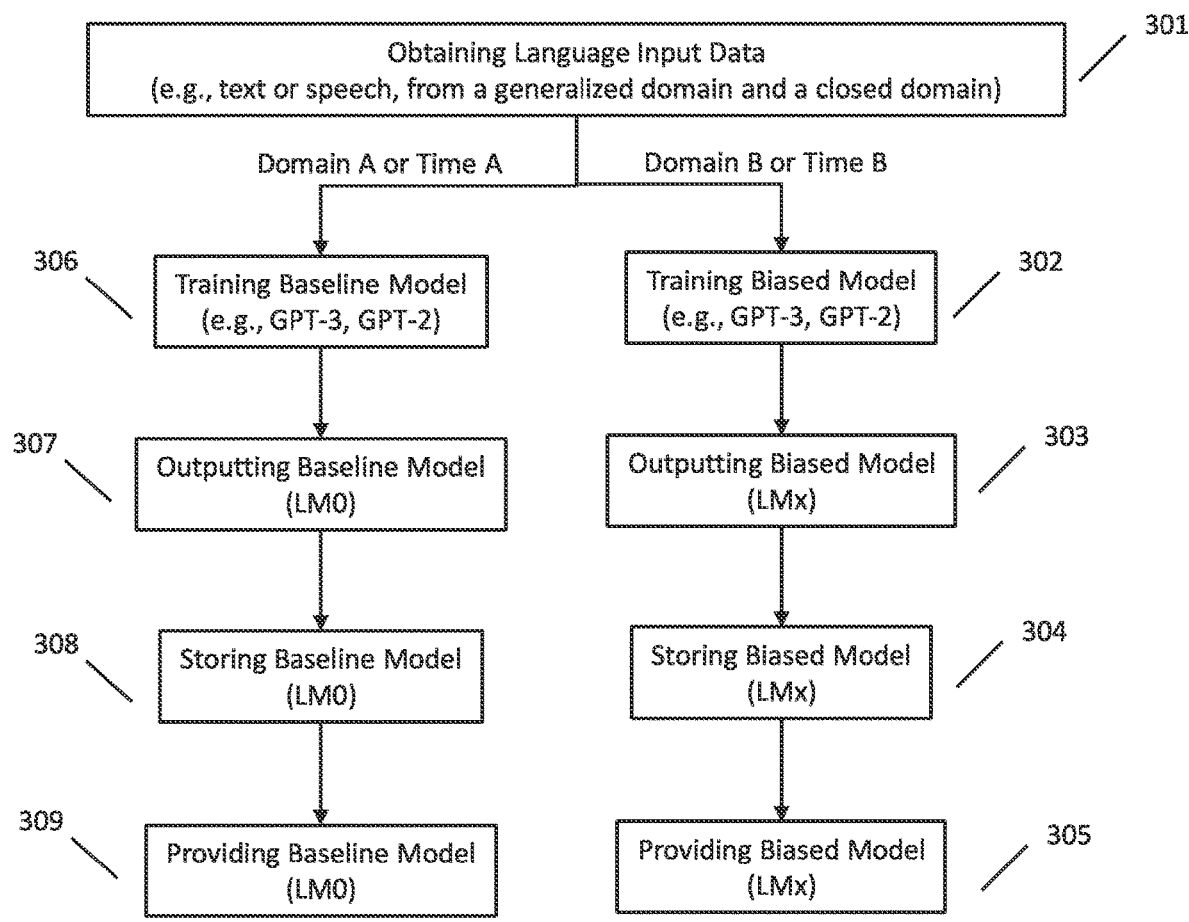
FIG. 3 is an example method of producing different language models for use in combination.

In an embodiment where one or more models are to be prepared, provided, run or made accessible, an example of doing so is illustrated in FIG. 3. In this example, training data is obtained for the models at 301. In the specifically illustrated example, the training data is obtained in the form of language input data for training an NLG model. It will be readily understood that an entity may train one, both or none of the models described herein. In the example of FIG. 3, the training data obtained at 301 is language input data in the form of text data or speech data that has been converted to text, useful as training data for an NLG model. Examples of sources of the language data include, but are not limited to, a closed domain such as a social media message stream for healthcare workers in a private social media community, a closed domain of particular consumer segments such as company-customer service interactions stored in a CRM or marketing database, an open or public domain including a broader social network or population group segmented by demographics or other characteristic, or a massive collection of source text such as many internet publications as used to train GTP-2, GTP-3, or Turing Natural Language Generation (T-NLG).

In one example, an existing model is utilized, e.g., as Model 1 of FIG. 2 may be publicly available GPT-2, whereas the existing model is further trained via obtaining language input data, e.g., from a closed domain to create a biased model, e.g., Model 2. In the example of FIG. 3, language input data obtained at 301 is used for training the models at 302 and 306 to generate biased and baseline models, respectively. After training the models, the models are output at 303 and 307, e.g., as biased (LMx) and baseline (LMx) models, respectively. Each of the models may be stored as indicated at 304 and 308, which allows for providing them at 305 and 309, e.g., as a service via exposing APIs for interacting with the models.

As described herein, the language input data provided at 301 may be different to train a baseline model at 306 and a biased model at 303 for use in comparison. In one example, the difference is using different source data, e.g., a closed domain (Domain B) is used to train a biased model at 302 whereas a generalized training set (Domain A) is used to train the baseline model at 306. It will be noted that the baseline model, although prepared with generalized data, e.g., a massive training set of published internet documents, may contain biases as well, although different from the model trained on the closed domain. In this respect, training of a baseline model at 306 may take the form of fixing a model at a point in time or as trained with a certain amount of a training set. For example, a generalized model may be trained on a massive set of documents and the models parameters fixed (Time A). Likewise, the biased model may be trained using the massive set of documents but allowed to develop over time (Time B). As such, the baseline and biased models may be trained by time differentiation.

In one embodiment, by way of specific example, baseline (LM0) and biased models (LMx) are prepared for a use case related to social media text mining. A generative baseline language model (LM0) is prepared by accessing GPT-2 via API and training it using a generic (relatively) unbiased text content (Domain A) at 306, particularly as compared to the bias induced by training on a closed domain. In one example, the bias of the baseline model (LM0) may be tracked, monitored and evaluated to make adjustments, e.g., by using different time domains, as described herein. A biased model (LMx) is trained at 302 as a fine-tuned version of GPT-2 that has been trained using language input data from a target population or inside a closed domain (Domain B). The biased model (LMx) is developed inside a closed domain where there is a legal basis for a data processor to access the original text data, noting that the model architecture may be provided in a privacy preserving manner, as further described herein. Once a generative model (LMx) has been developed on the closed domain, it can be output at 303 and stored at 304, allowing it to be provided at 305 for querying, prompting or otherwise using it to produce results that can be compare with outputs of other models, e.g., from other closed domains or a generic unbiased model, i.e., a baseline model (LM0).

Continuing with the specific, non-limiting example and referring back to FIG. 2, the biased model (LMx) is sampled by a selection of prompts provided at 203 corresponding to the information needs of the social media text mining campaign to create outputs, e.g., a synthetic sample pool of generative language (Px). The same sampling is similarly performed using LM0 at 204 to create outputs, e.g., a synthetic content pool (P0). The differences between Px and P0 are analyzed to discover opinions and issues of the population as related or associated with the different model outputs generated from training on the different data sets.

In the example of a biased model (LMx) that has been fine-tuned at 302 using social media data from a target domain and population, the trained model contains a complex relational statistical model between words in the content. It has been demonstrated that this type of generic language model can be used for various tasks including text classification, parsing, and question-answering. In an embodiment, after the biased model (LMx) has been trained at 302, it is used to generate text statements that are relevant for an input prompt, as indicated at 203, 205 of FIG. 2. Some examples of models, prompts and generated texts are shown in Table 1.

TABLE 1

Examples of prompted text generations from a generic GPT2 model (LM0) and a model (LMx) fine-tuned for social media content on CPAP social media content for a specific prompt on mask types.

| Prompt | Model (LM0 - gpt2) Output | Model (LMx - cpap_gpt2_512_50e) Output |
|---|---|---|
| full face mask does not cause | full face mask does not cause blood to pool near the eye. | full face mask does not cause me to have claustrophobia. I . . . |
| full face mask does not cause | full face mask does not cause any skin burn. Just give it a try | full face mask does not cause the mask to leak. I have been using . . . |
| full face mask causes | full face mask causes a rash called a dermatitis, a severe skin condition | full face mask causes the pressure to run higher. I've tried the other . . . |
| full face mask causes | full face mask causes its inner body to be more active and alert. The | full face mask causes condensation and a feeling of hot, moist air in . . . |
| nasal mask does not cause | nasal mask does not cause any vision loss. It will protect . . . | nasal mask does not cause any problems. I am sure my sinuses . . . |
| nasal mask does not cause | nasal mask does not cause any serious harm to the body. Although this . . . | nasal mask does not cause acne breakouts, as he stated. |
| nasal mask causes | nasal mask causes her to emit a blinding flash of light. She has . . . | nasal mask causes me to mouth breathe. I do get a lot of . . . |
| nasal mask causes | nasal mask causes no effect on muscle growth. | nasal mask causes me to wake up many times during the night, causing |

In the examples of table 1, the prompts are indicated (first column) and the language generated synthetically by the models is listed (second and third columns), as emphasized via italics. In an example where a user is interested in what kind of effects different nasal and full face CPAP masks causes or does not cause to the sleep apnea patients, the different models can be used to operate on the same prompt to provide insights as to which characteristics of nasal and full face CPAP masks are important, liked, disliked, etc., in comparison to the general population. In an embodiment, the models are used to generate thousands of text generations for comparison. As indicated in table 1, the language generations of the baseline model (LM0) in the second column are content-wise nonsensical; however, a large collection of these is a lexically balanced set of phrases that have a high likelihood for the given prompt in the original training content of the general domain model (LM0). The language generations in table 1 of the biased model (LMx), on the other hand, are clearly on the target in the topic area of CPAP mask user experiences.

Figure 4:
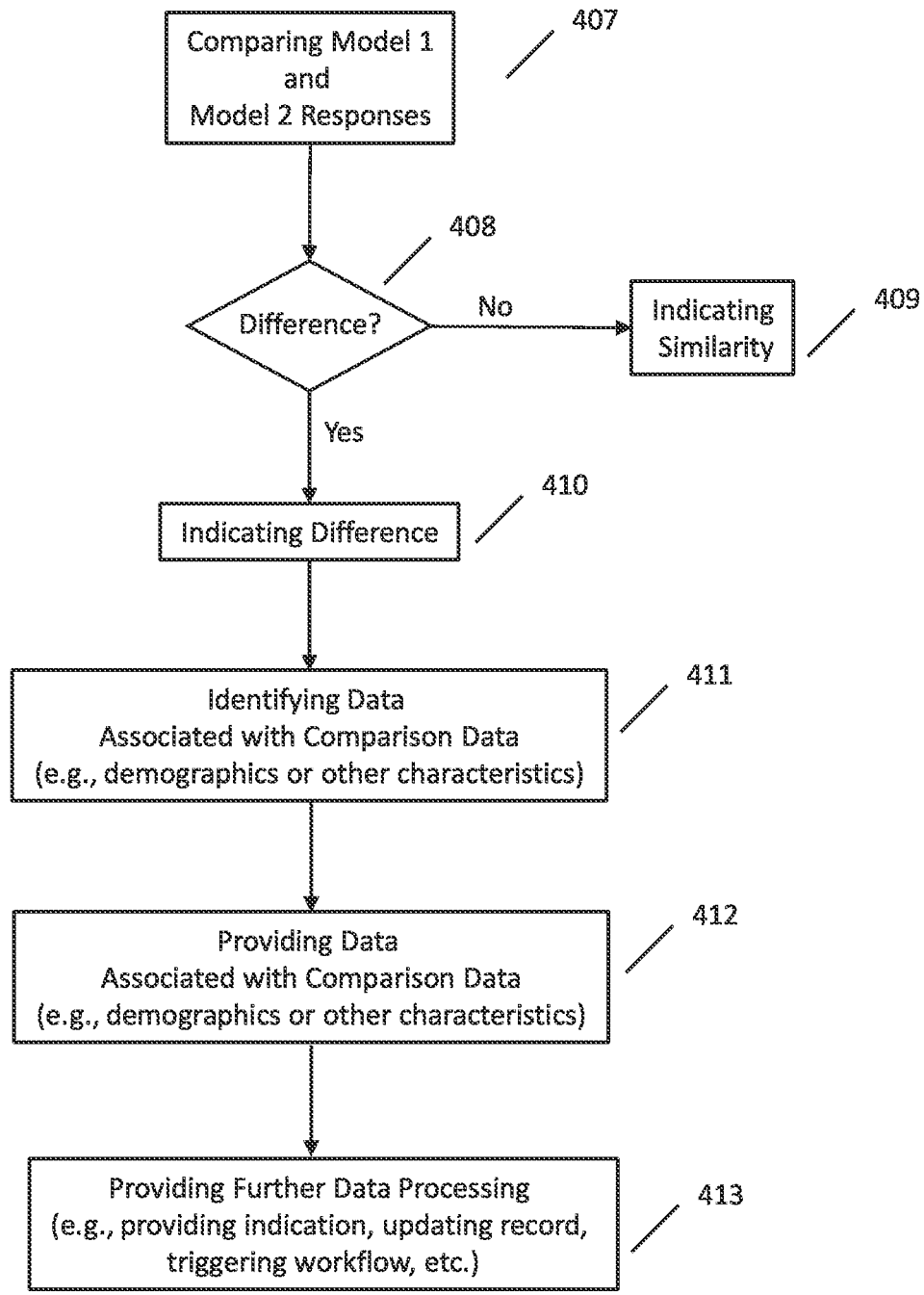
FIG. 4 is an example of using comparison data.

Referring to FIG. 4, in some embodiments a method may include a comparison of model outputs, e.g., performed by comparison device 130 as illustrated in FIG. 1. In the example of FIG. 4, a comparison of Model 1 and Model 2 responses is performed at 407 to determine differences in the response of the models, as indicated at 408. In an embodiment that performs a comparison or comparisons, a variety of techniques may be utilized to indicate a similarity or difference in the responses, as indicated at 409 and 410, respectively. For example, an embodiment may quantitate the differences in the responses based on an analysis of the text according to a model. By way of specific example, comparison device 130 may be programmed with a model, such as a bag of words (BOW) model, useful in scoring textual differences in the response of Model 1 and Model 2 for making a comparison at 407. In one example, a BOW model may be defined as consisting of important words and phrases, e.g., manually selected based on relevance for a topic area. For example, the biased model (LMx) column of Table 1 includes topics like claustrophobia, leak, pressure, etc., indicated in the generated text.

The BOW model is a vector corresponding to the counts of these words or phrases in a collection of text generations produced by the models as a response to the prompt. Similarly, an embodiment may use a baseline model (LM0) to generate text and supply the generated text and words or phases of interest to a BOW model for comparison. In one embodiment, a simple rectified difference vector may be calculated, e.g., for determining the numerical difference between the text generations of the biased (LMx) and baseline (LM0) model with respect to the words or phrases of interest. The rectified difference vector may be used in a variety of ways, e.g., to plot the numerical distinctions between the model outputs in comparison to different prompts or topics, such as indicated in Table 1.

Figure 4A:
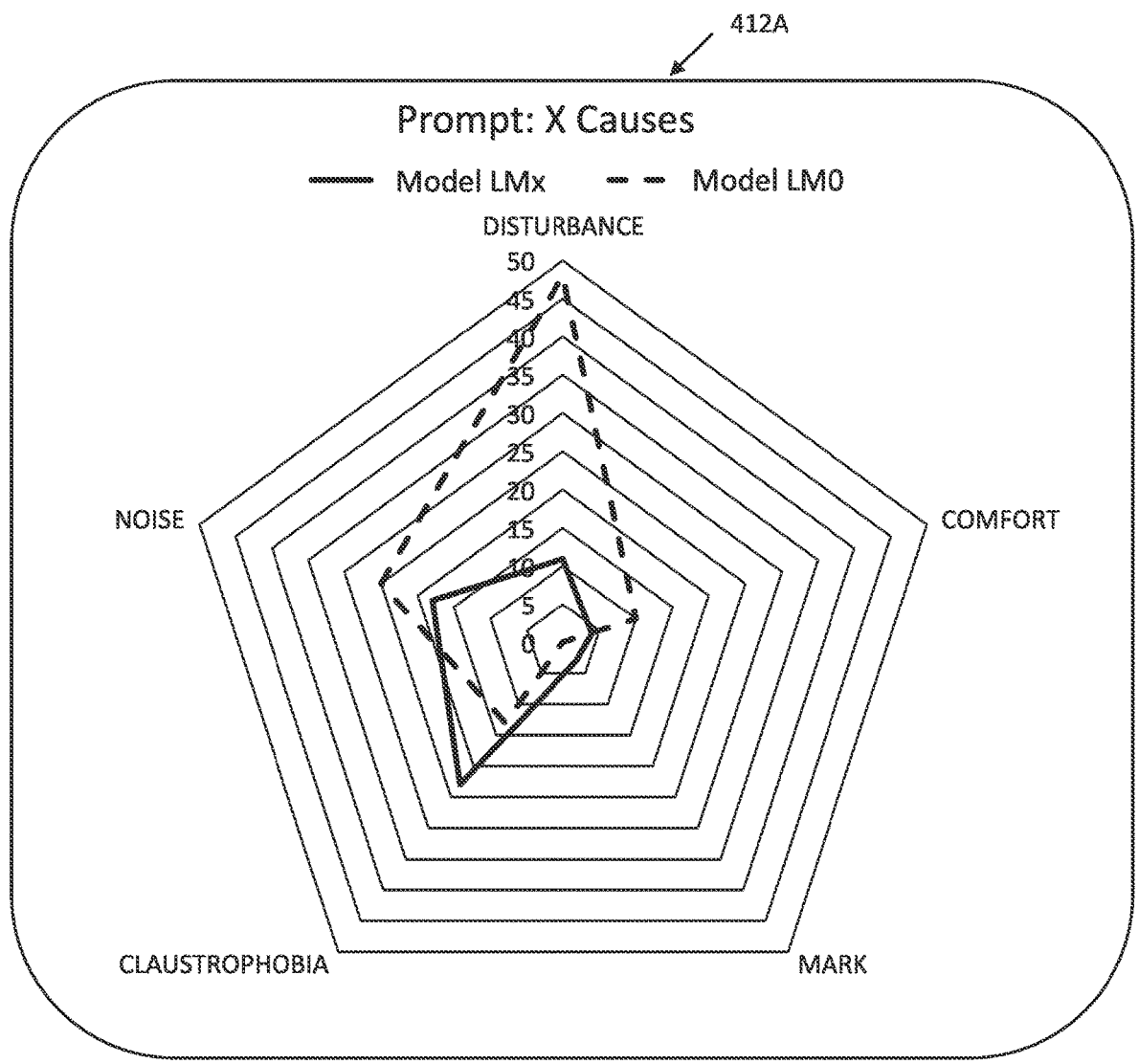
FIG. 4A is an example of comparison data.

The example of FIG. 4A illustrates an example of a display of data 412A that may be generated based on comparison data. Here, differences in opinions of users (that provided source language input for training the models) for a given prompts towards a list of predefined topics (here NOISE, DISTURBANCE, COMFORT, CLAUSTROPHOBIA, and MARK) in the BOW model are charted. The display of data 412A of FIG. 4A illustrates the values of a rectified difference vector in one use case comparing the models' responses to prompts related to a product, e.g., a full face mask, as per the examples in Table 1. Here, FIG. 4A illustrates an example comparison between the text generations of LM0 (e.g., based on public GPT-2 trained with general data) and those of LMx (based on the public GPT-2 model as trained using a large amount of social media postings of CPAP users, e.g., 1.5 million). FIG. 4A shows differences in two the text generations of the two models and highlights that CPAP users generally associate the full face mask with a feeling of claustrophobia due to a more closed structure, whereas this is not identified as strongly using the LM0 model.

As may be appreciated, an embodiment may extend the analysis, e.g., BOW model analysis, in various ways to produce visual data as shown in the example of FIG. 4A. In other embodiments, BOW models may be used to provide similar results from various other model comparisons, e.g., a baseline model (whether trained on relatively unbiased population or another target, biased training set) and one or more targeted models. This allows for an embodiment to prepare comparison data, e.g., for display of comparative results to an end user. For example, models trained on different brands of masks may be prompted and the results compared as per the example of FIG. 4A to highlight the differences there-between, as related to topics of interest, e.g., to provide graphical overlay(s) to compare users' reactions (synthetically produced using the models) based on which brands these users identify with, etc.

An embodiment may utilize different technique(s) to provide the comparing at 407 or difference determination at 408. For example, an embodiment may utilize a clustering method to produce clusters for text generations provided by the baseline model (LM0) and the biased model (LMx) followed by some comparison or evaluation of clustering differences. In one example, the clusters may be displayed to an end user to highlight the differences in clusters of words, phrases or sentiments produced by different models to indicate the different focuses of the different models and thus the target populations used to form them. As mentioned, in one example, an embodiment may simply display the differences, e.g., similar to Table 1, in a display interface that provides the end user with options for filtering or sorting to be applied, e.g., top ten responses from many thousands of text generations by each model displayed, keyword searching and highlighting provided, etc.

In the example of FIG. 4, it will be understood that an embodiment may include additional or alternative steps with respect to comparing the text generations of various models. As illustrated, an embodiment may utilize comparison data, e.g., different sentiments scores for primary topics produced by differentially trained language generation models, different key words or phrases of importance to the models, etc. to produce automated or semi-automated actions. In one example, an identification may be provided at 411 based on the comparison data. For example, an identification provided at 411 may include identifying data for use in a subsequent indication or action, such as identifying different topics, keywords or sentiments of interest or importance for one model, the other, or each model based on textual generations. Similarly, identified data at 411 may be used as or used to provide an indication produced at 412. An indication provided at 412 may include a notification, an alert or other communication directed to an application end point, e.g., a CMR or marketing application, such as highlighting a topic of interest to a target population, providing a comparison between a target population and a general population relating to a branding effort, etc.

Further, an embodiment may provide a method to utilize the comparison data or data derived from the comparison data at 413, for example useful in triggering further workflows, record updates, or subsequent indications. In one example, an embodiment may produce or receive, or both, data based on the comparison of the two models to impact other systems or applications. In one example, an embodiment may provide input to an automated workflow of an external system such as a CRM or marketing system, alerting a brand manager or customer service manager to negative sentiment indicated by a comparison of a model for a target population or customer as compared with a general population model. An example of such a workflow is an automated notification appearing in the CRM or marketing system in an account record associated with the target population associated with the biased model (LMx), or an email, a text or SMS message, push notification, or other notification provided via a communications device indicating the same.

In an embodiment data sent to a model, e.g., prompts obtained at 201 of FIG. 2, may be generated programmatically, e.g., using a multi-shot learning approach based on a template with one or more variable parts. For example, a prompt "I like mask because" can be constructed from a pattern: A (I like) B (mask) C (because), where the possible variables in this example are those listed in Table 2.

TABLE 2

Example variables for automated prompt generation

| A | B | C |
|---|---|---|
|  | Full face mask | is |
| I like | Nasal mask | because |
| I hate | Cpap machine | causes |
| I think | Brand A | Does not cause |
| ... | ... | ... |

Different combinations of the components of Table 2 can be used to construct a large number of prompts. A set or target keywords may be defined, such as comfort, leak, and claustrophobia, based on topics of interest.

An embodiment evaluates the models, e.g., LM0 and LMx, for all prompts and repeats this evaluation process, e.g., thousands of times, to accumulate BOW vectors for each. An embodiment computes the difference vectors, as previously described. The most prominent opinion in the target population X may be found, e.g., according to an equation or predetermined rule such as a rule based on vector values. Similarly, an embodiment finds the second most prominent opinion, etc.

An embodiment may also be programmed to allow focus on selected prompts, e.g., from within a set such as those listed in the Table 2, e.g., only opinions about Brand A. Based on scoring statistics, an embodiment may then discover, for example, that in the X population the users are two times more likely to state that Brand A causes nostril sore as compared to stating that Brand A causes a dry mouth. An embodiment therefore may be used to automatically optimize prompts, queries, etc., for example to find prompts that lead to more desired type text generations.

As with the generation of prompts, an embodiment uses a generative language model for selection of prompts or questions. For example, a prompt given to the language model may be: "full face mask causes." Such prompts are an important aspect of triggering a language model to return appropriate responses. These prompts are made up of two elements, namely, the intent and the entity. The entity is the object for which one tries to extract the insight. For example, it can be full face mask, nasal mask, etc. The intent can be utilized to understand causality, likeability, significance, definition, etc., about the entity. In-order to avoid missing out on an important prompt and avoid repeating prompts, an embodiment uses the language model itself to also detect a suitable entity and intent. In an example, a user may enter or provide a few prompt examples and let the language model generate more examples. By way of explicit example, the following sequence may be produced according to an embodiment (where the italics are synthetic language generated by the language model):

Prompt: A full face mask
Answer: causes
Prompt: A full face mask
Answer: feels
Prompt: A nose mask
Answer: doesn't
Prompt: A neck mask
Answer: hurts Then an embodiment may present or further use these generated texts as priors and make use of additional data, such as a knowledge base and templates, to create a complete set of prompts that can be used to mine insights. For example, from the supplied and generated prompts, it can be determined, e.g., with the help of a knowledge base, that a full face mask and a nose mask are all types of masks. Hence, an embodiment may utilize this inferred data (mask types) to extrapolate similar prompts to other type of masks. This way, an embodiment synthetically augments the prompts to cover an entire entity-set and aligns the prompts to the type of intents that occur.

In an embodiment, the biased language model and rectified vector(s) can be used to generate questions. These questions are useful when interviewing a user about the product and its features, e.g., from the point-of-view of the designer or developer of the product. The questions are useful in identifying key topics to target concerns other users have vocalized, as determined from the models of the underlying data sets, e.g., users on social media, in closed communities such as clinical discussion forums, etc.

Therefore, in an embodiment opinion mining in a population can be combined with meta-data about the comparison or population, e.g., as provided at 412 of FIG. 4. For example, an embodiment may provide at 412 a typical or exact count of Brand A and Brand B users, differences in opinions about two different product types, demographics related to the opinions, top questions or prompts generated by one or more of the models synthetically, etc. This type of data such as provided at 412 can be utilized directly, e.g., provided to a reviewing user, or may be transmitted to a downstream process such as an automated workflow step, etc., as shown at 413.

As described herein, in an embodiment multiple biased models from different closed domains may be analyzed in a joint representation to discover differences between different domains. For example, the different closed domains may correspond to groups or populations from different hospitals or people of different ages, genders, or health conditions. By way of specific example, an embodiment may be used to conduct analysis of text generations of models trained on these different populations to provide quick insights, e.g., a possibility to discover more complex relations such as younger users complain 45% more often that leaks are caused by body movement than older users.

Where privacy is a consideration, an embodiment may utilize the model architecture and features, e.g., parameters or weights provided via training on different populations, etc., and have no need to access the underlying data set. That is, a trained model may be exported or made available in an obfuscated manner disassociated with the underlying source text. This offers an opportunity for trained models from diverse sets of populations, even where data privacy considerations require that the source data not be accessed, are available for use, e.g., as baseline or biased models.

Figure 5:
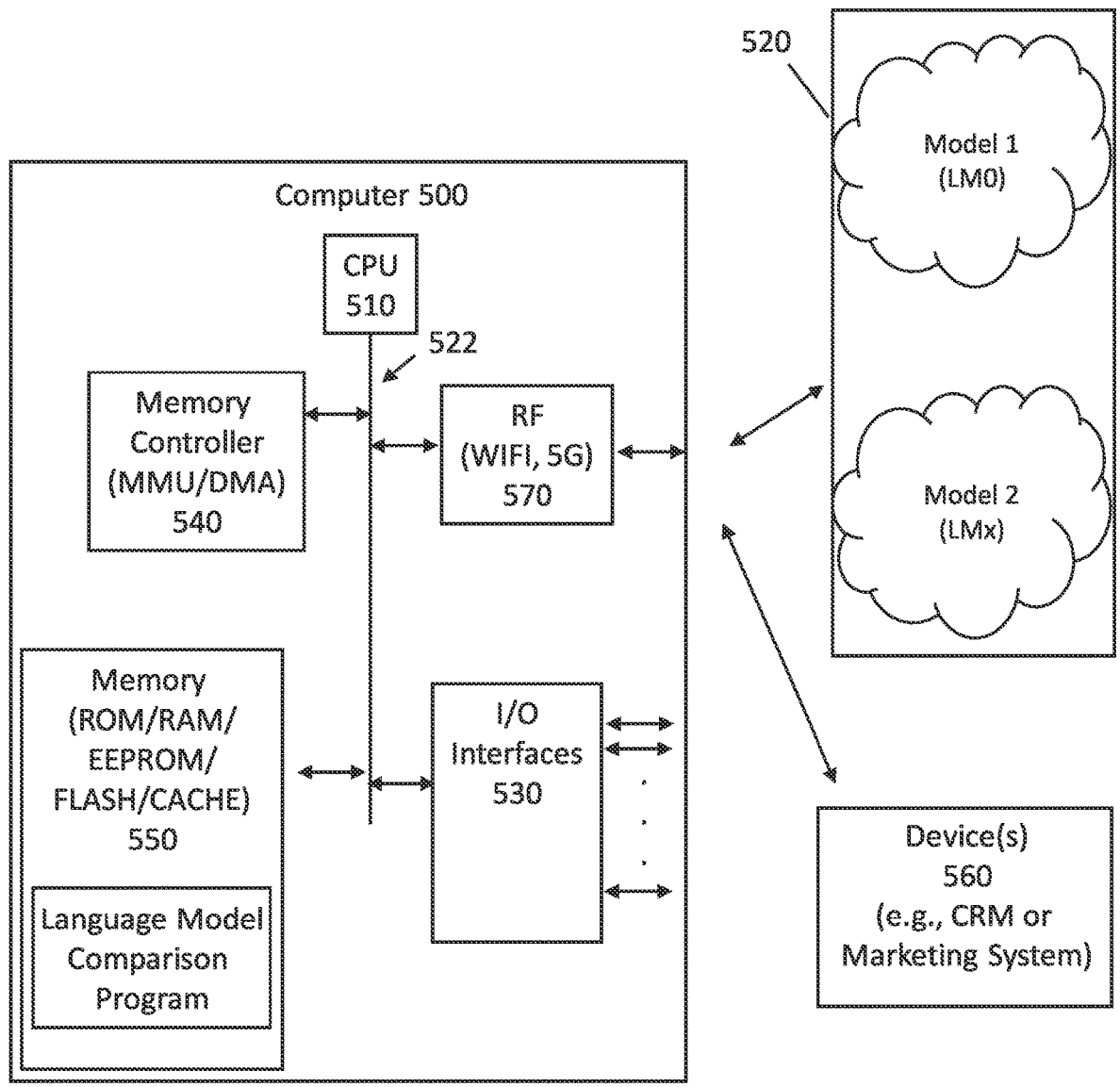
FIG. 5 is a diagram of example system components.

Referring to FIG. 5, it will be readily understood that certain embodiments can be implemented using any of a wide variety of devices or combinations of devices and components. In FIG. 5 an example of a computer 500 and its components is illustrated, which may be used in a device for implementing the functions or acts described herein, e.g., as input device 110, modeling device 120, or comparing device 130. In addition, circuitry other than that illustrated in FIG. 5 may be utilized in one or more embodiments. The example of FIG. 5 includes functional blocks, as illustrated, which may be integrated onto a single semiconductor chip to meet specific application requirements.

One or more processing units are provided, which may include a central processing unit (CPU) 510, one or more graphics processing units (GPUs), and/or micro-processing units (MPUs), which include an arithmetic logic unit (ALU) that perform arithmetic and logic operations, instruction decoder that decodes instructions and provides information to a timing and control unit, as well as registers for temporary data storage. The CPU 510 may comprise a single integrated circuit comprising several units, the design and arrangement of which vary according to the architecture chosen.

Computer 500 also includes a memory controller 540, e.g., comprising a direct memory access (DMA) controller to transfer data between memory 550 and hardware peripherals. Memory controller 540 includes a memory management unit (MMU) that functions to handle cache control, memory protection, and virtual memory. Computer 500 may include controllers for communication using various communication protocols (e.g., I²C, USB, etc.).

Memory 550 may include a variety of memory types, volatile and nonvolatile, e.g., read only memory (ROM), random access memory (RAM), electrically erasable programmable read only memory (EEPROM), Flash memory, and cache memory. Memory 550 may include embedded programs, code and downloaded software, e.g., language model comparison programs for producing or utilizing the differential outputs of models to produce visuals such as illustrated in FIG. 4A, triggering automated or semi-automated actions, such as outlined in FIG. 4, etc. By way of example, and not limitation, memory 550 may also include an operating system, application programs, other program modules, code and program data, which may be downloaded, updated, or modified via remote devices.

A system bus 522 permits communication between various components of the computer 500. I/O interfaces 530 and radio frequency (RF) devices 570, e.g., WIFI and telecommunication radios, may be included to permit computer 500 to send and receive data to and from remote devices using wireless mechanisms, noting that data exchange interfaces for wired data exchange may be utilized. The computer 500 may operate in a networked or distributed environment using logical connections to one or more other remote computers or databases. The logical connections may include a network, such local area network (LAN) or a wide area network (WAN), but may also include other networks/buses. For example, computer 500 may communicate data with and between a device 520 running one or more language models and other devices 560, e.g., a CMR or Marketing system that provides data or updates to, or receives data or updates from, computer 500, such as an indication of a population segment associated with comparison data generated by language model outputs, as described herein.

The computer 500 may therefore execute program instructions or code configured to store and analyze model output data to indicate differences between the models and produce outputs related thereto and perform other functionality of the embodiments, as described herein. A user can interface with (for example, enter commands and information) the computer 500 through input devices, which may be connected to I/O interfaces 530. A display or other type of device may be connected to the computer 500 via an interface selected from I/O interfaces 530.

It should be noted that the various functions described herein may be implemented using instructions or code stored on a memory, e.g., memory 550, that are transmitted to and executed by a processor, e.g., CPU 510. Computer 500 includes one or more storage devices that persistently store programs and other data. A storage device, as used herein, is a non-transitory computer readable storage medium. Some examples of a non-transitory storage device or computer readable storage medium include, but are not limited to, storage integral to computer 500, such as memory 550, a hard disk or a solid-state drive, and removable storage, such as an optical disc or a memory stick.

Program code stored in a memory or storage device may be transmitted using any appropriate transmission medium, including but not limited to wireless, wireline, optical fiber cable, RF, or any suitable combination of the foregoing.

Program code for carrying out operations according to various embodiments may be written in any combination of one or more programming languages. The program code may execute entirely on a single device, partly on a single device, as a stand-alone software package, partly on single device and partly on another device, or entirely on the other device. In an embodiment, program code may be stored in a non-transitory medium and executed by a processor to implement functions or acts specified herein. In some cases, the devices referenced herein may be connected through any type of connection or network, including a local area network (LAN) or a wide area network (WAN), or the connection may be made through other devices (for example, through the Internet using an Internet Service Provider), through wireless connections or through a hard wire connection, such as over a USB connection.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method, comprising:
   obtaining, from an input device, language input data;
   providing, using a set of one or more processors, the language input data to a first generative language model and a second generative language model;
   obtaining, using the set of one or more processors, a first response from the first generative language model and a second response from a second generative language model; and
   providing, using the set of one or more processors, an indication of a difference between the first response from the first generative language model and the second response from the second generative language model.

2. The method of claim 1, wherein:
   the first generative language model was trained on a first set of documents; and
   the second generative language model was trained on a second set of documents, different than the first set of documents.

3. The method of claim 2, wherein the second set of documents comprises documents generated by users having a characteristic not associated with users that generated the first set of documents.

4. The method of claim 2, wherein:
   the first set of documents comprise data of social media posts publicly available via a social network; and
   the second set of documents comprise data of a closed domain that is not publicly available.

5. The method of claim 1, comprising providing one or more of the first generative language model and the second generative language model.

6. The method of claim 5, wherein the providing the one or more of the first generative language model and the second generative language model comprises obfuscating details of a training set used to train one or more of the first generative language model and the second generative language model.

7. The method of claim 1, comprising determining a difference between the response from the first generative language model and the second response from the second generative language model.

8. The method of claim 1, wherein the obtaining the language input comprises providing a graphical user interface for indicating a prompt for the first generative language model and the second generative language model.

9. The method of claim 1, wherein the obtaining the language input comprises receiving an indication of prompt template data for repeatedly prompting one or more of the first generative language model and the second generative language model.

10. The method of claim 1, wherein the providing an indication of a difference between the response from the first generative language model and the second response from the generative language model comprises one or more of:
    transmitting displayable data to a client device for displaying the difference between the response from the first generative language model and the second response from the second generative language model;
    determining a numeric difference between the response from the first generative language model and the second response from the second generative language model; and
    triggering an automated process based on the difference between the response from the first generative language model and the second response from the second generative language model, wherein the automated process is one or more of providing a notification to a predetermined endpoint, updating a record in an associated system, and triggering an automated workflow in an associated system.

11. A system, comprising:
    a set of one or more processors; and
    a set of one or more memory devices storing code executable by the set of one or more processors to:
    obtain language input data;
    provide the language input data to a first generative language model and a second generative language model;
    obtain a first response from the first generative language model and a second response from a second generative language model; and
    provide an indication of a difference between the first response from the first generative language model and the second response from the second generative language model.

12. The system of claim 11, wherein:
    the first generative language model was trained on a first set of documents; and
    the second generative language model was trained on a second set of documents, different than the first set of documents.

13. The system of claim 12, wherein the second set of documents comprises documents generated by users having a characteristic not associated with users that generated the first set of documents.

14. The system of claim 12, wherein:
    the first set of documents comprise data of social media posts publicly available via a social network; and
    the second set of documents comprise data of a closed domain that is not publicly available.

15. A computer program product, comprising:
    a non-transitory storage medium comprising computer executable code, the computer executable code comprising:
    code that obtains, from an input device, language input data;
    code that provides the language input data to a first generative language model and a second generative language model;
    code that obtains a first response from the first generative language model and a second response from a second generative language model; and
    code that provides an indication of a difference between the first response from the first generative language model and the second response from the second generative language model.

* * * * *